United States Patent [19]
Penczynski

[11] 3,876,823
[45] Apr. 8, 1975

[54] ELECTRICAL CONDUCTOR MADE UP OF INDIVIDUAL SUPERCONDUCTING CONDUCTORS

[75] Inventor: Peter Penczynski, Erlangen, Germany

[73] Assignee: Siemens Aktiengesellschaft, Munich, Germany

[22] Filed: Feb. 11, 1974

[21] Appl. No.: 441,348

[30] Foreign Application Priority Data
Feb. 14, 1973   Germany............................ 2307242

[52] U.S. Cl............ 174/128; 174/15 C; 174/DIG. 6
[51] Int. Cl............................................. H01v 11/00
[58] Field of Search......... 174/15 C, DIG. 6, 126 R, 174/126 CP, 128, 130, 113 R, 117 R

[56] References Cited
UNITED STATES PATENTS
| | | | |
|---|---|---|---|
| 3,355,544 | 11/1967 | Costley et al.................. | 174/130 X |
| 3,365,538 | 1/1968 | Voigt............................. | 174/DIG. 6 |
| 3,686,428 | 8/1972 | Lombardi et al.............. | 174/130 X |
| 3,699,647 | 10/1972 | Bidault et al.................. | 174/DIG. 6 |
| 3,737,989 | 6/1973 | Schaetti........................ | 174/DIG. 6 |

*Primary Examiner*—Arthur T. Grimley
*Attorney, Agent, or Firm*—Kenyon & Kenyon Reilly Carr & Chapin

[57] ABSTRACT

An electrical conductor which is particularly useful in the transmission of three-phase current, and which comprises an inner conductor made up of a plurality of individual super-conducting conductors arranged in several layers and an outer conductor also made up of a plurality of individual superconducting conductors, surrounding the inner conductor concentrically and spaced therefrom, in which at least the individual conductors of the inner conductor are of an elliptical cross section with their major axes perpendicular to radials of the inner conductor to result in a conductor having a-c losses which are relatively small.

6 Claims, 1 Drawing Figure

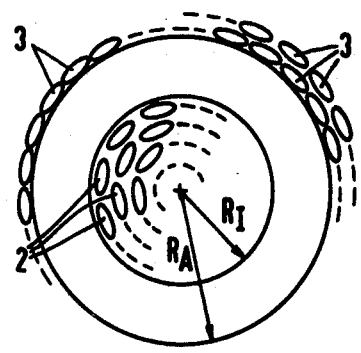

ELECTRICAL CONDUCTOR MADE UP OF INDIVIDUAL SUPERCONDUCTING CONDUCTORS

BACKGROUND OF THE INVENTION

This invention relates to electrical conductors in general, and more particularly to conductors made up of superconducting individual conductors for use in the transmission of three-phase current.

Recent technological development in regard to superconductive materials along with advances in low temperature technology have made the transmission of very high power through superconducting cables possible. With the availability of such techniques, it must further be determined whether transmission should be three-phase alternating current or direct current. Transmission of direct current through superconducting cables, has the advantage that no a-c losses occur but has as a significant disadvantage, the fact that rectifier systems capable of handling very high power levels are required to be developed and used. Because of this, d-c cables normally have been considered primarily for the transmission of the highest power e.g., up to 200 GW, where what are normally referred to as hard superconductors such as niobium-titanium and niobium-tin combinations are applied. Because of their higher operating costs per kilometer, as compared to d-c cables, superconducting three-phase cables would appear to be suitable primarily for the transmission of energy over short distances up to 100 km, for example, depending on the power and voltage to be transmitted. In particular, their use would appear advatageous for feeding medium to large amounts of power (1 to 10 GW) from existing high voltage a-c systems to concentrated areas of high energy consumption such as cities.

Because of the a-c losses, what are normally referred to as soft superconductors such as niobium and, to a lesser extent, lead, are normally used in three-phase conductors. The a-c losses in niobium will remain low, as long as the magnetic field strength occuring at the surface of the conductor remains below the critical field strength $H_{c1}$ which is about $1.1 \times 10^5$ A/m at 4.2 K. Current in such superconducting conductors, flows only in a surface layer which is a fractin of a micrometer thick, so that very small layer thicknesses of the superconductor can be used. The typical conductor shapes contemplated for this use have been cylindrical and hollow cylindrical designs, to avoid non-uniform current distribution.

A number of previous a-c cable designs have been proposed. One such three-phase cable is disclosed in German Pat. No. 1,640,750 which provides a separate conductor for each phase. Each of the phase conductors is designed using an inner tubular superconducting forward phase conductor, and surrounding this inner conductor, a tubular superconducting return phase conductor with the two conductors arranged concentrically with a predetermined spacing of sufficient magnitude for the voltage being carried, through the use of specially designed spacer elements. As taught therein, the tubular superconducting phase conductors can be stabilized through the use of the normally conducting material. In this arrangement, the three return conductors of the three-phases are coupled together at the cable input so that complete field compensation outside the conductor system is achieved. The conductors are free of forces, the current and field distribution at the conductor surfaces is homogeneous and the a-c losses of the superconductor due to geometry are small. Proper spacing between the inner and outer conductors allows a specified high voltage breakdown strength to be achieved. In this arrangement, however, the electrically stabilizing effectiveness of the normally conducting material is limited. This limitation comes about due to the skin effect which occurs in a tubular configuration. Furthermore, the cable must be length compensated when cooling down through the use of corrogated members. The major disadvantage of this rigid cable arrangement is in its need for difficult installation procedures in the field.

For this reason, Klaudy proposed in "Elektotechnik und Maschinenbau," Vol. 82, 1965, p. 275 to 281 the construction of a conductor arrangement of several three-phase systems with each system consisting of three thin, insulated superconductor wires, arranged in a triangle as close together as possible. With this design, it is possible to provide a flexible cable having almost perfect field compensation at its exterior. However, transmission voltages must be kept low, to avoid insulation problems and large dielectric losses.

Another article published in "Elektrotechnik und Maschinenbau," Vol. 89, 1972, p. 93 to 110, discloses d-c cables which provide for flexibility through the construction of the overall cable from individual conductors, electrically connected in parallel and combines therewith the advantage of high voltage strength obtained from tubular conductors by constructing the coaxially related forward and return conductors for the individual phases out of superconducting individual conductors. In this arrangement, the individual conductors are placed side-by-side in one or more layers on concentric circles about the axis of the conductor in the longitudinal direction. They may, for example, be superconducting wires stabilized with normal conducting material such as copper or aluminum. By subdividing the phase conductors into many individual conductors, the stabilizing effect of the normally conducting material in the conductor is increased and the short circuit capacity of the overall cable is enlarged. Because of their larger cross section percentage of normal conducting material, multi-layer arrangements are better than single layer arrangements.

Although these types of cables appear to be advantageous and are definitely so with regard to the carrying of d-c currents, problems arise in their application to three-phase a-c applications. When using cables such as this with several concentric layers of conductors, the use of the individual superconducting wires instead of concentric tubes for the forward and return conductors, leads to an increase in the a-c losses. Because of its larger diameter, the outer conductor of each phase has the smaller a-c losses so that the main problem of losses resides with the inner conductor. It is well known that these a-c losses can be slightly reduced if the individual conductors are placed, relative to each other, in such a manner that each individual conductor assumes a uniform share of the current. In an arrangement such as this, which is referred to as a "transposed" arrangement, the a-c losses for a phase conductor made up of individual conductors transposed in several layers with circular cross sections are larger by a factor of 3.6 than in a smooth tube arrangement having a corresponding radius, ignoring the material constants of the superconductors in considering only the geometry. These losses are the result of an increase in the field at the surface of the individual conductors, since in an arrangement such as this, each current carrying individual conductor is situated in the external transversal field of all other individual conductors. Depending on the magnitude of the demagnetization factor N for the specific conductor material, this external transversal field leads to an increase in the field with respect to the individual conductors which is inversely proportional to 1-N.

Thus, it can be seen that their is a need for an improved multi-layer a-c conductor for use in a three-phase cable which retains the advantages obtained through multi-layer construction while at the same time reducing the a-c losses through a reduction of the excess field.

SUMMARY OF THE INVENTION

The present invention comprises an arrangement which solves this provlem by making at least the individual conductors of the inner conductor, such that they have an electrical cross-section with the major axes of the cross sections perpendicular to radials of the inner conductor.

The electrical conductor of the present invention has as its advantage, in addition to a small increase of the field on the surface of each of the individual conductors, the reduction of a-c losses. Considering purely geometric considerations, the a-c losses are higher only by a factor of 1.6 with respect to the rigid tube arrangement. This factor is attained within a few percent if the ratio of the major half-axis a of the ellipse to the minor half-axis b of the ellipse is approximately 3 : 1. Preferably, the conductor according to the present invention will have a ratio which is at least equal to 3.

Further advantages are obtained, if, once the number $m$ of individual conductors needed and the ratio $a{:}b$ is established, the major axes of each individual conductor is made to satisfy the following relationship:

$$ a = \frac{1}{m} \cdot \frac{2\sqrt{5} \cdot R_I}{3/2 \cdot (1+\cos\alpha) - \sqrt{\cos\alpha}} $$

where $R_I$ is the outside radius of the inner conductor and $\sin\alpha \times = \sqrt{1 - b^2/a^2}$ and is the eccentricity of the ellipse. An arrangement such as this will result in minimum a-c losses.

Preferably, as disclosed in connection with the preferred embodiment of the invention, the individual conductors will be aluminum wires provided with a coating of niobium. This causes an increase in the short-circuit capacity of the conductor. This capacity is highly dependent on the Joule losses per surface area of the normally conducting stabilization material. The lower these Joule losses, the larger is the permissible over-current. With an increasing number of individual conductors arranged in several layers, such losses increase for a given conductor diameter $R_I$, since with a given radius and with increasing numbers of individual conductors, the cross section of the individual conductors will be smaller and thus, the geometrical dimensions of the cross section areas can become even smaller than the depth of penetration into the conductor material (skin effect). The increase of Joule losses as a result of these effects is smaller for aluminum than, for example, for copper since the depth of penetration for aluminum is less due to the better residual resistance ratio of aluminum. As a consequence, the depth of penetration will exceed the wire diameter only where a large number of individual conductors are used. As a function of eccentricity, the Joule losses have a distinct minimum point which is at an angle $\alpha$ of between about 70° and 75°.

BRIEF DESCRIPTION OF DRAWINGS

The single FIGURE is a cross sectional view illustrating in schematic form, a cable constructed according to the present invention.

DETAILED DESCRIPTION OF THE PREFERRED EMBODIMENT

As shown, the figure illustrates a one-phase conductor of a three-phase cable. As shown, the phase conductor is essentially made up of individual superconducting conductors 2 and 3 of which only a few are shown in detail on the figure. The individual conductors 2 are arranged on concentric circles within an outside inner conductor radius designated $R_I$. Typically, the conductors within the circle defined by the radius $R_I$ will be used as the forward conductors for one phase of a three-phase system. At a predetermined spacing which is established in order to provide proper insulation and ensure the high voltage strength of the phase, a further layer made up of individual conductors arranged concentrically about the individual conductors 2 is provided. The individual conductors 3 will be in at least one layer and as indicated by the figure can comprise a plurality of layers. Typically, the individual conductors 3 will serve as the return conductor of this phase of the three-phase system.

The mutual positioning of the conductors 2 will preferably be chosen so that each conductor has an equivalent position relative to its own field and an external field (transposition). As illustrated, the individual conductors are of an elliptical cross section with an eccentricity whose angle $\alpha$ as defined above is approximately 75°. The major axis of each ellipse is perpendicular to radials of the overall conductor. Preferably, the individual conductors will comprise a core of aluminum wire used for stabilization on which a superconductor material, preferably niobium, is applied, for example, by plating. The individual conductors can be protected from electrical contact with adjacent individual conductors through the use of a conventional insulating jacket. The insulating jackets can be constructed to ensure a mutual fixed position of the individual conductors.

A phase conductor according to the present invention and which contains individual niobium-coated aluminum wires 2 and 3, can be used, for example, for transmitting an operating current of $10^4$ A at an operating voltage of 64 kV. The power transmitted by a three-phase cable with three such phases will be approximately 2,000 MVA. A conductor of such capacity can be constructed with the radii of the forward and return conductor of one phase being as follows: $R_I = 3 \times 10^{-2}$ $m$ and $R_A = 5 \times 10^{-2}$ $m$, respectively. With these dimensions, a peak value of the magnetic field for the forward conductor designated $H_S$ of 94.3 mT is obtained. This value is considerably smaller than the value for the lower critical field strength of niobium designated $H_{c1}$ (Nb) which is approximately 150 mT. To obtain optimum stabilization with a minimum of a-c losses, a configuration where the number of conductors $m$ is about 25 and the angle $\alpha$ is about 75° is used. In accordance with the equations given above for these conditions, $a = 4 \times 10^{-3} m, b \times 10^{-3}$m. As noted above, $m$ is the number of individual conductors 2, sin $\alpha$ is the eccentricity and $a$ and $b$ respectively are the half-axes of the elliptical cross section of the individual superconducting conductors.

In the illustrated embodiment, the individual superconducting conductors 3 used for the return of the phase are of an elliptical cross section. That is, their design is essentially the same as that of the individual conductors 2. However, as noted above, the a-c losses for the coaxially arranged return conductor are much smaller since the magnetic field is small due to the large radius $R_4$ and, because of this, the individual conductors 3 may, if desired, be of circular cross section. The return conductor can thus be made with one or several layers. In any case, to provide for sufficient capacity should normal conduction occur, the normally conducting cross sectional area available for the current must correspond to that of the forward conductor.

A conductor made according to the present invention will have lower a-c losses. In the figures given below in order to show the advantage of this construction independent of material constants, the a-c losses P are referred to an identical coaxial tubular conductor. Under these conditions, the ratio $P:P_{tube}$ is about 1.6. The Joule losses for the normal conductor carrying the operating current are approximately $S_L = 0.005$ W/cm². In contrast to this, the losses $S_R$ for a corresponding tubular conductor with copper as the stabilizing material and a tube wall thickness of 3 mm is approximately equal to 0.053 W/cm². With a slight temperature rise of the conductor of approximately 0.5 K, approximately 0.6 W/cm² can be removed by a typical helium bath. Thus, the permissible overcurrent, e.g., the short-circuit current can be 11 times the operating current with the arrangement of the present invention. In contrast to this, the permissible short-circuit current of a corresponding tubular conductor could not be appreciably more than three times the operating current.

In addition, the transposition of superconducting conductors 2 and 3 can be made such that the length of the overall conductor remains constant with temperature changes.

Thus, an improved superconducting cable which can be used for conducting three-phase currents has been shown. Although a specific embodiment has been illustrated and described, it will be obvious to those skilled in the art that various modifications may be made without departing from the spirit of the invention which is intended to be limited solely by the appended claims.

What is claimed is:

1. An electrical conductor which is particularly suited for the transmission of three phase current and is of the type comprising an inner conductor made up of individual superconducting conductors arranged in a plurality of layers and an outer conductor of individual superconducting conductors surrounding said inner conductor concentrically, wherein the improvement comprises:
    a. individual conductors of the inner conductor being of an elliptical cross section with their major axes perpendicular to radials of the inner conductor.

2. An electrical conductor according to claim 1 wherein the ratio of the major to the minor axes of the elliptical cross section of the individual conductors is at least equal to three.

3. An electrical conductor according to claim 2 wherein for a given radius $R_I$ of the inner conductor, a given eccentricity, sin $\alpha$ of the individual conductors, and for a given number $m$ of individual conductors, the major half-axis of the cross section of each individual conductor designated $a$ fulfills the following equation:

$$a = \frac{1}{m} \cdot \frac{2\sqrt{5} \cdot R_I}{3/2 \cdot (1+\cos\alpha) - \sqrt{\cos\alpha}}$$

where the eccentricity sin$\alpha$ equals $\sqrt{1 - b^2/a^2}$ and $b$ is the minor half-axis of the cross section of the individual conductors.

4. An electrical conductor according to claim 1 wherein the individual conductors each comprise a core of high purity aluminum with a coating of niobium.

5. An electrical conductor according to claim 2 wherein the individual conductors each comprise a core of high purity aluminum with a coating of niobium.

6. An electrical conductor according to claim 3 wherein the individual conductors each comprise a core of high purity aluminum with a coating of niobium.

* * * * *